United States Patent
Lysenko et al.

(10) Patent No.: US 6,215,199 B1
(45) Date of Patent: Apr. 10, 2001

(54) WIND-DRIVEN ELECTRICAL ENERGY GENERATING DEVICE

(75) Inventors: Adolf Lysenko, 160 72nd St., ap. 784, Brooklyn, NY (US) 11209; Sergey Lysenko, 244 Kennedy Dr., Apt. 405, Malden, MA (US) 02148

(73) Assignees: Adolf Lysenko, Brooklyn, NY (US); Sergey Lysenko, North Andover, MA (US)

( * ) Notice: Subject to any disclaimer, the term of this patent is extended or adjusted under 35 U.S.C. 154(b) by 0 days.

(21) Appl. No.: 09/438,335

(22) Filed: Nov. 13, 1999

(51) Int. Cl.$^7$ ..................................................... F03D 9/00
(52) U.S. Cl. ............................................. 290/44; 290/55
(58) Field of Search ................................. 290/1 A, 2, 43, 290/44, 54, 55; 60/641.1

(56) References Cited

U.S. PATENT DOCUMENTS

| | | | |
|---|---|---|---|
| 3,721,290 | * 3/1973 | Butler, Jr. | 165/85 |
| 3,883,750 | 5/1975 | Uzzel | 290/55 |
| 3,944,840 | 3/1976 | Troll | 290/55 |
| 4,021,135 | 5/1977 | Pedersen | 415/2 |
| 4,031,173 | 6/1977 | Rogers | 261/24 |
| 4,036,916 | 7/1977 | Agsten | 261/109 |
| 4,070,131 | * 1/1978 | Yen | 415/3 |
| 4,075,500 | 2/1978 | Oman | 290/55 |
| 4,132,499 | 1/1979 | Igra | 415/2 |
| 4,154,556 | 5/1979 | Webster | 415/2 |
| 4,164,382 | 8/1979 | Mysels | 415/2 |
| 4,204,799 | 5/1980 | de Geus | 415/2 |
| 4,289,970 | 9/1981 | Deibert | 290/44 |
| 4,379,236 | 4/1983 | Inoue | 290/55 |
| 4,452,046 | * 6/1984 | Valentin | 60/641.11 |
| 4,508,973 | 4/1985 | Payne | 290/55 |
| 5,194,754 | 3/1993 | Mikami | 290/55 |
| 5,300,817 | 4/1994 | Baird | 290/55 |
| 5,982,046 | * 11/1999 | Minh | 290/55 |
| 6,097,104 | * 8/2000 | Russell | 290/54 |

* cited by examiner

Primary Examiner—Nicholas Ponomarenko

(57) ABSTRACT

A wind-driven electrical energy generating device includes a tower (1) with the double, concentrically arranged walls, installed on a rigid turntable (14) with means for provide its rotation in horizontal plane. The inner wall of the tower forms an upwardly oriented venturi duct (3) with a flared perforated exit (5); there is a ring chamber between the inner and outer walls this tower (7). The tower positioned on the turntable by means of a skirt (10) that has windows for intake the air. A quantity of rotor (20) freely rotatable on a rigid axle positioned within the venturi duct. A rotors rim (29) carry an electrical armature—field poles (23). The stator armature (24) in the form of identical modules consisted of windings and rectifying blocks situated atop and the underside of the armature of the rotor. The armature along with the magnets of the rotor, situated in the ring chamber of the tower (7). The vanes of the rotor (28) have control means for changing the angle of attacks whereby electrical linear tubular stepping motor. That motor transform a linear motion along the axle of the rotation of the rotor to the changes of the angle of attacks the said vanes when said vanes rotates about the spokes (27) of the rotor. The additional winding modules for starting and braking the rotors situated on the stator.

7 Claims, 5 Drawing Sheets

WIND-DRIVEN ELECTRICAL ENERGY GENERATING DEVICE

BACKGROUND—FIELD OF INVENTION

This invention relates to a device for utilizing the power of the wind.

BACKGROUND—DESCRIPTION OF PRIOR ART

For many years mankind has been challenged to harness the force of the wind for the beneficial purposes. The discovery of fossil fuels such as coal oil, and gas in the nineteenth century made energy much more efficient and versatile. With the invention of the steam and internal combustion engines the use of fossil fuels quickly overtook all other the energy sources and directly led to the Industrial Revolution in the late 1800s.The Industrial Revolution brought the prosperity and progress, but it also brought the big environmental problems. The products of combustion of fossil fuels are pollutants. Such pollutant includes poisons such as sulfates, nitrates, carbon oxides, etc. The pollutants are now concentrated in the air of our major cities and are diffusing throughout the air of our planet.

In the second half of our century some scientists and engineers had a big hope that this problem will be solved by construction of the atomic plants. Such plants, however, generate nuclear waste, which is inherently dangerous, and, in addition, present a serious problem. This leaves hydroelectric, solar, geothermal, tidal and wind as alternate energy sources which are environmentally clean and not inherently dangerous.

For this reasons the efforts to develop the more effective alternative sources of energy (also the wind energy) have been intensified. The great quantity of the wind generators was built in the last decades. The big quantity of the new types was proposed. One alternate energy source, which is particularly promising, is wind farms that are presently in use but only on a limited basis. Known wind generators are generally very large and expensive. Smaller relatively inexpensive units if of advanced, more efficient designs could provide more energy per land area, especially if utilized on a national or worldwide scale. Such unit could be utilized individually or connected to the existing utility power grids.

The existing wind generators have the disadvantages and deficiencies (we say about the big wind generators):
1. Those generators have high level of the acoustic noise.
2. The rotating metal vanes are causing noticeable electromagnetic interference and worsening receiving the radio and TV programs.
3. The rotating vanes are very dangerous for the birds.
4. The tremendous dynamically loading on the vanes of the wind generators and, therefore, the high probability of the fatigues damages.
5. The towers of the wind generators may be blows down in the hurricane or typhoon.

In addition, for compete with low-cost fossil fuels, the wind generators and another renewable sources of the energy must have a low cost of the construction and the maintenance.

To attain these ends (to compete with fossil fuels) the wind power plant must have a possibility to work in a big range of a speed of the wind. The range between the minimum speed of the wind that can rotate a wind machine and the furling speed (the wind speed at which a wind machine is shut down to avoid damage from high winds) must be far apart.

Various techniques are employed commercially or are disclosed in the patent literature for converting wind energy to electrical energy. One of the most interesting of the development is the wind turbine that has shrouds. Those turbines, in the opinions of the inventors, have a significantly greater output power than the conventional wind turbines. Note, for example, U.S. Pat. Nos. 3,883,750, Uzzell, Jr., (1975), 3,944.840, J. H. Troll, (1976), 4,021,135, Pedersen at al., (1977), 4,075,500, Oman at al. (1978), 4,132,499, C. W. Crook (1979), 4,204,799, deGeus, (1980), 4,379,236, M. Inoue, (1983), 4,508,973, Payne, (1985).

The shrouds in those wind turbines can increase the power output but they have a substantial disadvantage that they have a big length particularly in its diffuser section. That makes that construction very cumbersome and flimsy. That construction cannot to oppose the strong winds.

The examples of another lines of attack are the apparatus that can, in the opinions of the inventors, operate on the strong winds: U.S. Pat. Nos.4, 154,556, Webster, (1979), 4,164,382, K. J. Mysels, (1979), 4,379,239, (1983), 5,194,754, T. Mikami (1993)

These wind generators are very complex and they will have big problems under constructions and maintenance. The price of the energy in that wind generators will be high, and these power systems will be economical impractical.

As illustrated by the number of prior patents, as well as the commercial devices, effort are continuously being made in an attempt to improve devices for converting wind energy to electrical energy. Such efforts are being made to render such devices more efficient, reliable, inexpensive and convenient to use. None of these previous efforts, however, provide the benefits attendant with the present invention. Additionally, the prior patents and commercial devices and techniques do not suggest the present inventive combination of component element arranged and configured as disclosed and claimed herein.

The present invention achieves its intended purposes, objects and advantages through a new, useful and nonobvious combination of component elements with the use of a minimum number of functioning parts, at a reasonable manufacturing cost, and by employing only available materials.

OBJECTS AND ADVANTAGES

Several objects and advantages of the present invention are:
a) to provide a wind-powered electrical energy-generating device, which significantly increases the amount of energy, derived from the wind source;
b) to provide a wind-powered energy generating device of the aforesaid type which is simple in construction, inexpensive to produce and maintain which is highly efficient in its operations;
c) to provide a wind-powered electrical energy device that will be shielded from lateral wind loads thus reducing the structural requirements of the supporting tower of the generator system. That and other objects are achieved according to the present invention by providing a wind-powered electric generator having: a vertical shroud with the double walls arranged in a path of fluid flow and the rotors that freely rotate on axis disposed within said vertical shroud;
d) to provide a wind-powered electrical energy device with the light rotors that are driven by the air moving from a bottom to an upper part of the vertical shroud. The armature and field structures are situated in the space between the inner and outer walls of the shroud. That elements cooled by the air that is passing past, then this air go further to plurality of the air ducts that are situated in the upper part of the shroud; that prevent premature air separation along the diffuser of the shroud and therefore increasing the its effectiveness.
e) to provide the starting and braking possibility of the generator by electrical means;
f) to provide to aforesaid generator the means for controlling the rotational speed of the rotors wherein this means includes means for controlling the pitch of the rotor vanes

DRAWING FIGURES

REFERENCE NUMERALS IN DRAWINGS

| | |
|---|---|
| 1 | cylindrical tower |
| 2 | inner wall |
| 3 | venturi duct |
| 4 | intake narrowing end |
| 5 | flared perforated exit |
| 6 | outer cylindrical wall |
| 7 | ring chamber |
| 8 | upper cap |
| 9 | upper gate |
| 10 | bottom skirt |
| 11 | bottom window |
| 12 | windows |
| 13 | bottom gate |
| 14 | turntable |
| 15 | axle of turntable |
| 16 | bearings of the turntable |
| 17 | base |
| 18 | plate |
| 19 | large neck |
| 20 | rotor |
| 21 | rotors axis of rotation |
| 22 | struts |
| 23 | field poles |
| 24 | stator windings |
| 25 | orifices |
| 26 | hub of the rotor |
| 27 | spokes |
| 28 | vanes |
| 29 | rim of the rotor |
| 30 | windings of the satellite generator |
| 31 | poles of the satellite generator |
| 32 | rectifier |
| 33 | batteries |
| 34 | core |
| 35 | coil |
| 36 | rectifying block |
| 37 | electrical buses |
| 38 | plugs |
| 39 | body of the hub |
| 40 | bearings of the rotor |
| 41 | sleeve of the hub |
| 42 | rotor of the stepper |

-continued

| | |
|---|---|
| 43 | pin |
| 44 | groove |
| 45 | streamline elevation |

SUMMARY

In accordance with the present invention a wind-powered electrical energy-generating device comprising a tower with the double, concentrically arranged walls installed on a rigid turntable with means for provide its rotation in horizontal plane. The inner wall of the tower forms an upwardly oriented venturi duct with a flared perforated exit. There is a ring chamber between the inner and outer walls, a quantity of rotors freely rotate on a rigid axle positioned within the venturi duct. There is an electrical armature on the outer part of the rims of the rotors. Those armature and stator windings in the form of identical modules atop and the underside of the armature of the rotor situated in the ring chamber of the tower. The armature and windings are cooled by the air that is passing past, then this air go further to plurality of the air duct that are situated in the upper part of the shroud (diffuser) and preventing the premature air separation along the diffuser and therefore increasing the its effectiveness.

DESCRIPTION—FIGS. 1–7

Figure 1:
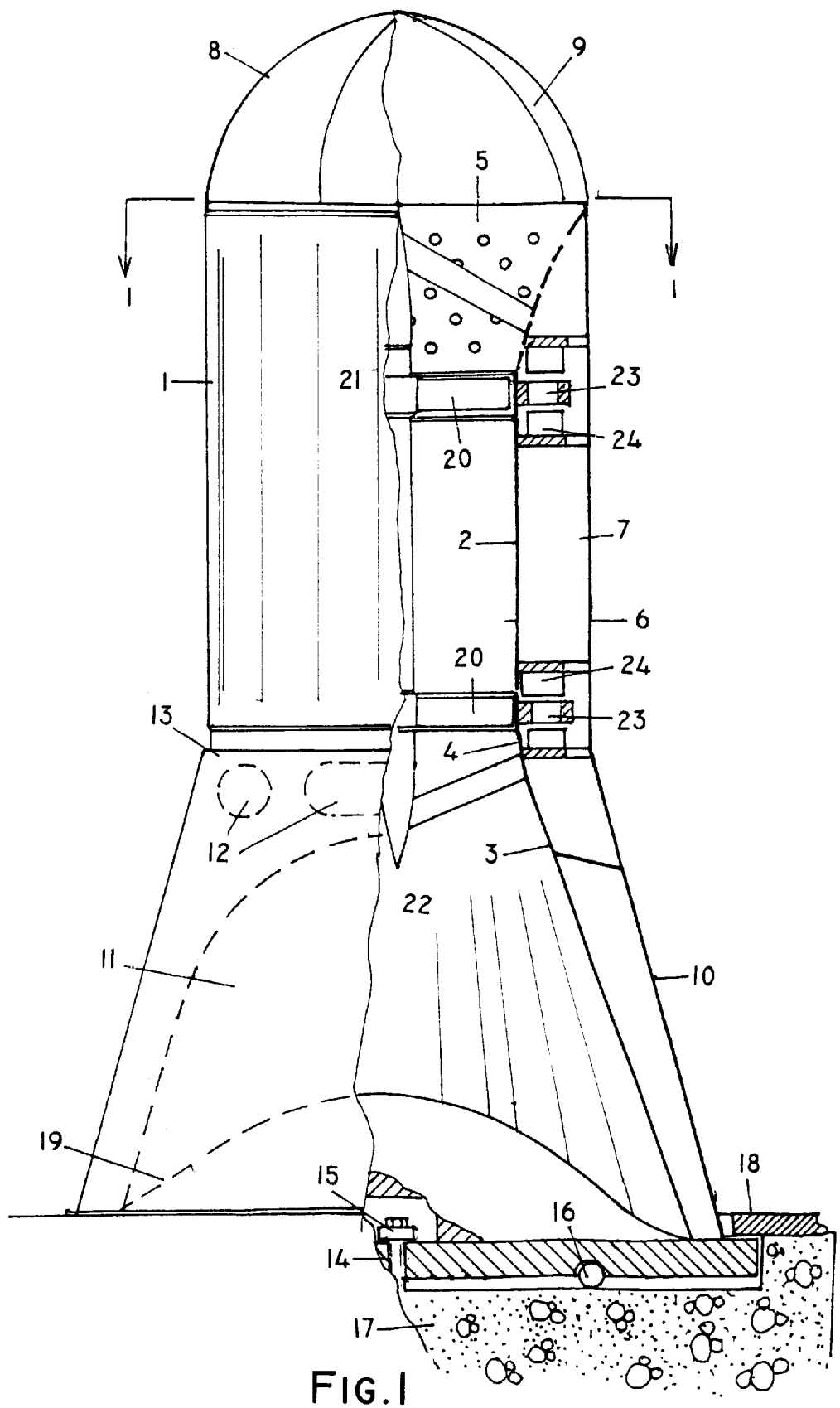
FIG. 1 is a partial sectional view of a wind-driven electrical energy device.
Figure 2:
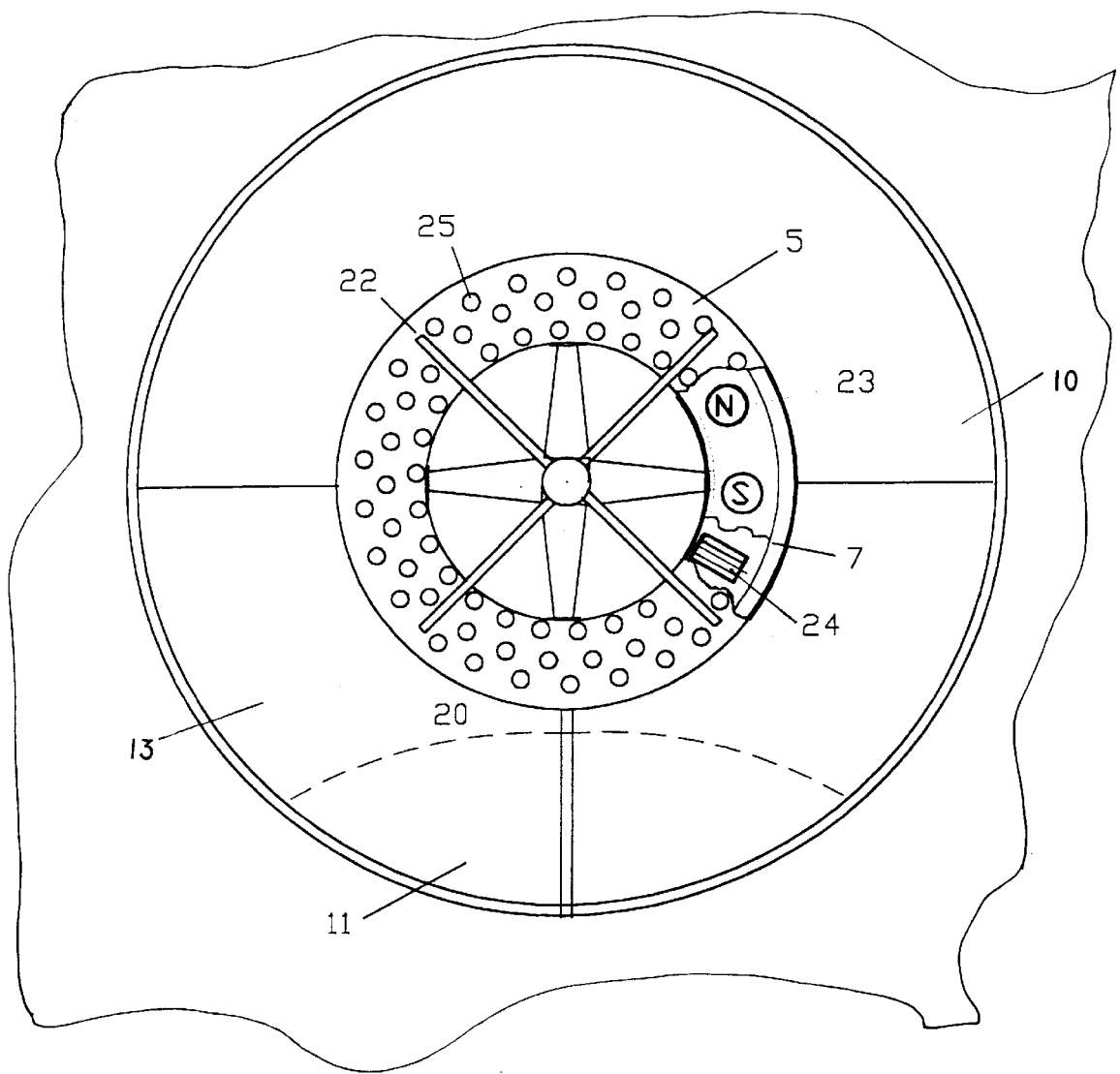
FIG. 2 is a plan sectional view of the device taken along line 1—1 of FIG. 1.

Refer now to FIGS. 1–2, which are a partial sectional view of a preferred embodiment of the invention and a plan sectional view of the device. The energy-producing device comprises of a vertical cylindrical tower 1 with the double concentrically arranged walls. The inner wall 2 of this tower forms an upwardly oriented venturi duct 3 with a lengthened neck. The upper part of that duct makes up a flared exit 5 with the perforated walls; the most diameter that exit equal to the diameter of the outer cylindrical wall 6. A cylindrical ring chamber 7 forms between the inner 2 and outer walls 6. The uppermost part of the tower has a cap 8. This cap turns the air emerging from the duct windward. The cap has a gate 9 for shielding the inner parts of the device in the bad weather.

An expanding to bottom skirt 10 with a window 11 supports the tower 1. Through the window 11 an ambient air may be drawn into the inner duct 3, and through the windows 12 an ambient air may be drawn into the ring cylindrical chamber 7. The windows 11 and 12 have a common gate 13. The skirt 10 is mounted on a rigid turntable 14 that is liable to rotate about vertical axis 15, and it has a means (not shown) for the rotating and fixing it in such a way as to keep the windows 11 and 12 windward.

The turntable 14 bears up against the bearings 16 that are rested on a hard base 17,and edges of the turntable are located under a brim of a static circular plate 18 that is stiffly tied with the base. This provides a way of withstands with a big loading that attacks on the generator tower 1 in time of the storms.

The inner wall 4 of the supporting skirt 10 and the duct 3 comprise a unified channel having at its lower end a large diameter neck 19. A central part of the channel is a narrow neck 3 with constant diameter in which a plurality of rotors 20 are situated. The rotors freely rotate about an axis 21 extending vertically in the duct and fixed in by the struts 22. There are the field poles 23 on the outer rim of the rotors. Stator windings 24 are fitted on the ring structural elements that were made from nonmagnetic material. The stator windings as well as the field poles are situated in the ring chamber 7. The outlet 5 with an uppermost opening represents a perforated diffuser that allows the air exiting the rotors 20 to return to the atmosphere. The upward flow of air in the venturi duct 3 rotates the rotors 20 to provide torque capable of creating a necessary voltage. The air entering the windows 12 and passing by stator windings in the chamber 7 and cooling it. Thereupon the air passes through the plurality of orifices 25 and ejected to the main stream.

Figure 3:
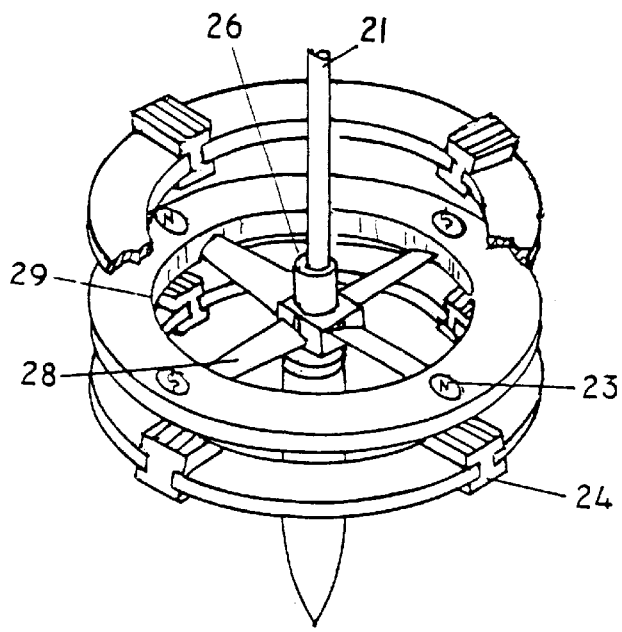
FIG. 3 is a perspective exploded view of the rotor with the field poles and static armature
Figure 4:
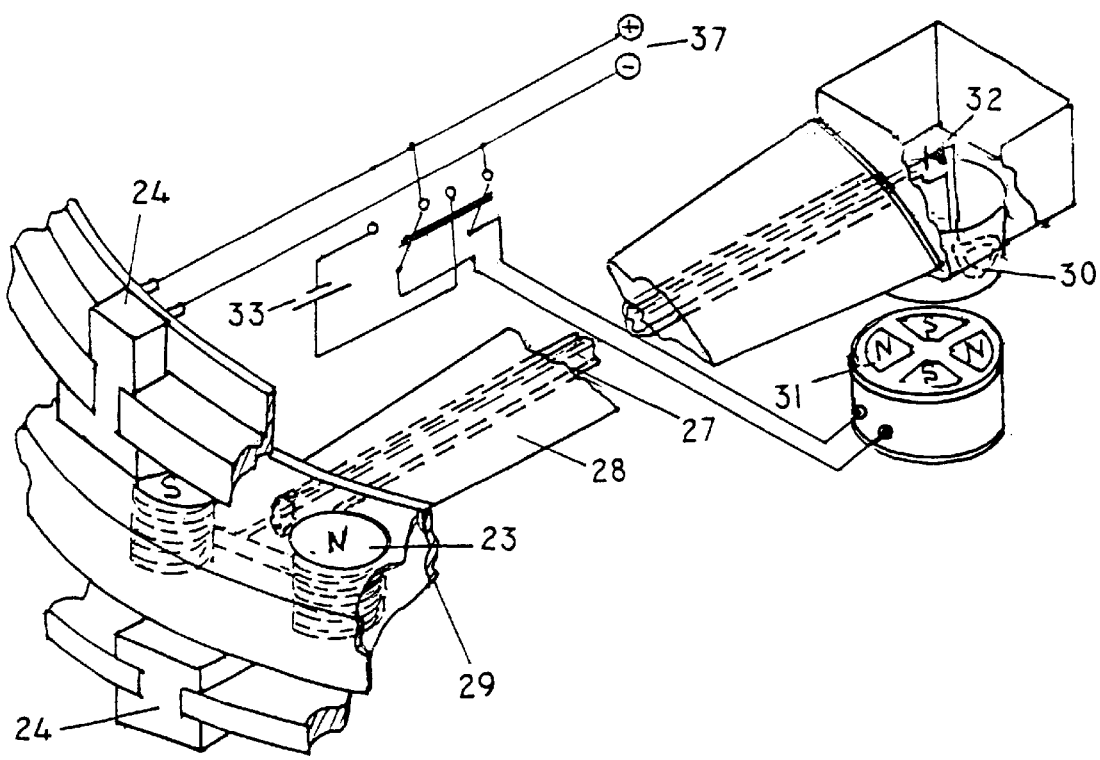
FIG. 4 is a perspective view of an electrical connection of the generator

FIGS. 3–4 is a perspective exploded view of a rotor with the field poles and the static armature of the generator and a perspective view of the electrical connections of the generator. Its show the internal component of the energy-producing part of the present invention including the construction of the rotors with the constituents of an electrical generator. The rotor powered by a wind fulfills the role of a rotor of the generator. It is consistent of a hub 26, spokes 27, the vanes 28, and rim 29. The spokes of the rotor are the axes of rotation for the vanes under the changing the output of the generator. An even number of the field poles 23 is situated perimetrically on the outer part of the rim of the rotor. A source of the energy for the field poles is a satellite generator that forms from flat windings 30 and the electromagnets or permanent magnets 31. The flat windings 30 are situated on the bottom butt of the hub of the rotor. The electrical stream induced in the winding 30 as the rotor rotates enters to a rectifier 32 and further arrives to field poles—electromagnets 23. Starting of the wind generator is performed by the use of storage batteries 33. The electromagnets are fed from the output of the generator when operating at nominal rating.

A second variant of the rotor is the rotor with the permanent magnets 23. In this case the main generator has no need of a satellite generator.

Figure 5:
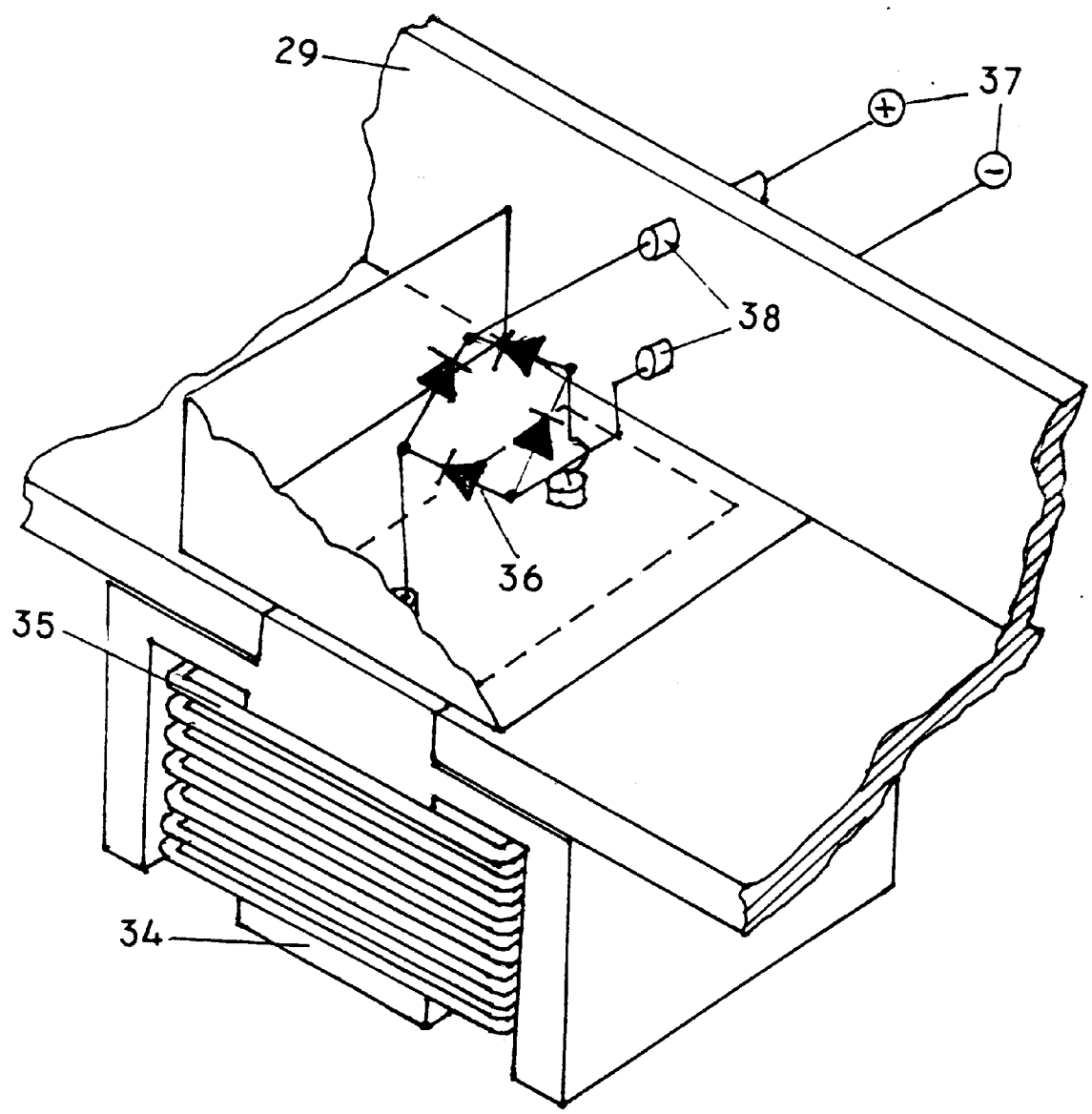
FIG. 5 is a perspective view of the modular element of the static armature.

There are also the static ring armature structures, which situated atop and underside the plane of rotation of the rotor. These armature structures made in the form of separate modules surround the rotor as well perimetrically. A stationary field structure comprises an even number of the discrete modules 24 (FIGS. 3–5). Every that module comprises of the core 34, a plurality of coil 35, and a rectifying block 36. A direct current output inducing in the every module 24 is carried to the positive and negative electrical buses 38 by a plug 37 this enables possibility simple replacing of the faulty blocks. Consequently, the every rotor has a stationary field structure that comprises of a two plurality of the modules 24 that are circularity positioned atop and underside of the field structures of the rotors. The windings outlined above can be used for an electrical starting and braking of the rotors. The moving armature structures and the static modules are situated between the inner and outer walls of the tower 1.

Figure 6:
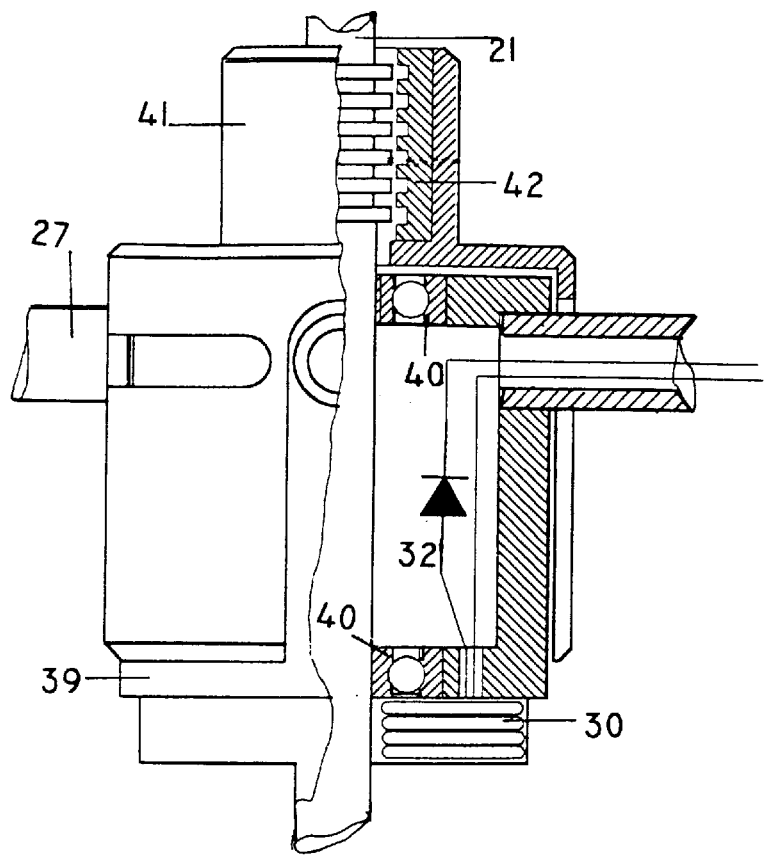
FIG. 6 is a partial sectional view of the hub of the rotor.

Referring now to FIG. 6 it is observed that the hub of the rotor comprises of a body 39 with the bearings 40 and the sleeve of the hub 41. That sleeve can move along the axis of rotation of the rotor 21. The upper part of the moving sleeve represents a "rotor" of the tubular linear stepper motor (stepper) 42. The adjacent part of the stationary axis is a "stator" of this motor. A movement of the sleeve is created by commands from some drive circuit (not shown). The windings of the satellite generator 30 reside in the bottom of the hub. The rectifiers of the satellite generator 32 reside inside of the hub.

Figures 7, 7A:
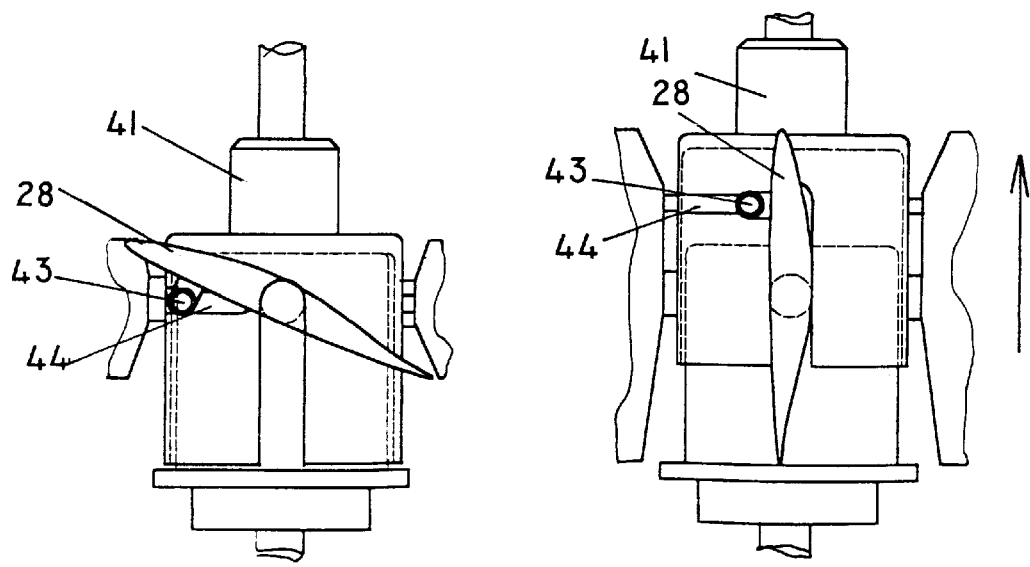
FIG. 7 is a view of the pitch control mechanism and the coupling of the vanes of the or to the pitch control mechanism.

A mechanism of varying of the pitch of the vanes had shown by FIG. 7. The spokes of the rotor 27 are the axis of rotation for the vanes 28. The output the rotor depends on the angle of attacks of the vanes. The root of the every vane has a short pin 43. The pins of the all vanes 43 enter into the grooves 44 in the sleeve of the hub 41. When the sleeve moving linearly pins 43 rotate the vanes about the spokes of the rotor.

In the center of the turntable of this device installed a streamlined elevation 45 for an organized flow of the air immediately on the intake of the duct.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claim appended hereto.

OPERATION—FIGS. 1–7

In accordance with the present invention, wind-driven electrical energy generating device is mounted in any desired location on the ground, preferably on places rising above the adjacent lowlands and where are no obstructions.

The tower 1(FIGS. 1–2) is positioned in such a way that windows 11 and 12 of the skirt 10 are situated in the direction of the wind. With the gates 9 and 13 open the wind enters the duct 3 and ring chamber 7. Velocity of the air is accelerated in the venturi duct, whereby, when it contacts the rotors it are rotated at increased velocity relative to the velocity of an unducted rotors of the same dimensions in the same wind.

The air entering in chamber 7 travels all the way from the lower part of the tower to the top. As this air passed by the stationary field structures—modules 24, it cooled them and then goes to exit in diffuser part of the duct through the plurality of annularly arrayed, axially spaced orifices 25.

The outlets of all the air orifices are disposed in the form of the channels in outwardly flared outlet 5. These air channels inject a flow of air of high kinetic energy from the airstream to the boundary layer of the main airstream within the diffuser section of the duct, and thereby reduce or prevent separation, which could cause a sharp lowering of rotors performance.

As the rotor begins its rotation an EMF is generated in moving windings of the satellite generator 30 (FIGS.3–5). In this time it must use a storage battery as source of energy. Thereafter electrical stream goes through the rectifier 32 to the field poles of the rotor 23. This revolving armature 23 in turn induced an EMF in the static armature modules 24. Upon leaving the rectifying blocks 36 direct current arrives to electrical buses 38. The field poles of the satellite generator (magnets) 31 are energized from the buses 38 after achieving some output.

The electrical output from this wind-driven direct current electrical generator may be used as direct electrical power, it may be converted to alternating current, or it may be used as a source of energy to be converted into other forms for storage. When the rotor with a field poles rotates between the static armature voltage are induced Varying the pitch of the vanes 28 (FIGS.6–7) effects the changing of speed of rotations of the rotor and, consequently, the output of the generator. As shown in FIG.5, when moving the hub sleeve 41 along the axle of rotation of the rotor the groove 44 cause moving the pin 43 that is situated on the root section of the vane 28. As this take a place, the vane turns up or down depending on of the direction of that movement. The hub sleeve 41 is a moving part of a linear tubular stepping motor and therefore powering the drive circuit of that motor we can changed a angles of pitch the vanes. The range of the angles of pitch may be varied from 0 to 90 degrees.

CONCLUSION, RAMIFICATION, AND SCOPE

Accordingly, the reader will see that the wind-driven electrical energy-generating device of this invention presents a comparatively simple facility for transforming energy of the wind to electrical energy. This electrical energy generating device has a low cost of the construction and the maintenance because is of simple design, it and may be build from a cheap materials. It has a few moving parts and has not moving electrical contacts. These factors have a favorable impact on a price of the generated energy. In addition, the design of this wind generator provides a possibility of working in a big range of a speed of the wind.

As a rotor of the generator are shielded from a direct action of the wind they do not experienced fatigue stresses from the gust of the wind, and, therefore, they have a high reliability. That reduces the structural requirements of the supporting tower and the generator system. The coils of the winding cooled by the passing air, then this air go further to plurality of the air ducts that are situated in the upper part of the duct that prevent premature air separation along the diffuser of the shroud and therefore increasing the its effectiveness. The special convention of this generator is that there are not moving electrical contacts in all design The generator has the means for controlling the rotational speed of the rotors wherein this means includes means for controlling the pitch of the rotor vanes, and has the means for starting and braking rotor by electrical means. As opposed to a current design of the wind generators our generator have low level of the acoustic noise, and its vanes do not cause electromagnetic interference and worsening receiving the radio and TV programs. By and large this device do not impact on the environment. The distinctive characteristics of that design that in the course of operation will be manifested itself an effect of the chimney. What this means is bigger design will be more effective.

Although the description above contains many specifities, these should not be construed as limiting the scope of the invention but as merely providing illustrations of some of the presently preferred embodiments of these inventions. For example, depending on the weather conditions of the site the turntable of the tower can be made as a static construction, or the tower need not be vertical, etc.

Thus the scope of the invention should be determined by the appended claim and their legal equivalents, rather than by the examples given.

What is claimed is:

1. A wind-driven electrical energy generating device comprising a tower with the double, concentrically-arranged walls, the inner wall said tower forms an upwardly oriented venturi duct with an intake narrowing end situated in the bottom of the tower and an flared perforated exit end situated in upper part of the tower with the most diameter said exit equal to the diameter of the outer cylindrical wall, therewith a cylindrical ring chamber forms between the inner and outer walls;

a quantity of rotors freely rotatable on a rigid axle positioned within said venturi duct, every of the rotor comprising of central hub, the plurality of spokes, on each said spoke is mounted a vane in such a manner that spoke is an axle of rotation for said vane, said spokes angularily-spaced, radially-extending connecting the central hub and a circular rim carrying the electrical armature, source of energy for that armature is a satellite generator situated on butt of the hub of the rotor; said vanes are situated in the venturi duct, and said armature is situated in the said cylindrical ring chamber of the tower; a stationary stator winding or field structures that comprises of an even number of discrete modules, each of the module comprises of the core, a plurality of coils, and a rectifying block, said modules circularly positioned atop and the underside of the field structures of the rotor in said cylindrical ring chamber, and the electrical direct current output from every said blocks are connected with common buses the plugs; a base comprising of a rigid turntable with means for provide its rotation in horizontal plane about the vertical axis and fix it in the necessary position, and with means for opposing the big wind loads exerting on said tower, and a narrowing up skirt positioned on said turntable with a set of a windows in the bottom part of the side surface of said skirt, said windows are positioned in such a way that air is arrived via said windows to the venturi duct and ring cylindrical chamber of said tower.

2. The wind-driven electrical energy—generating device of claim 1 wherein said circular rim of said rotor comprises the permanent magnets.

3. The wind-driven electrical energy—generating device of claim 1 wherein including control means for changing the angle of attacks of the vanes of the rotors whereby electrical linear tubular stepping motor through the transformation of the linear motions of the motor along the axis of the rotation of said rotor to the changes of the angle of attacks said vanes when said vanes rotates about said spokes of the rotor.

4. The wind-driven electrical energy generating device of claim 1 further comprising the additional stator windings for starting and braking said rotors whereby creating a variable and constant magnetic fields.

5. The wind-driven electrical energy generating device of claim 1 further comprising in upper part of the tower a special hat to ensure a turn of the exiting air windward, through a same angle.

6. The wind-driven electrical energy generating device of claim 1 wherein in the bottom of the central part of said skirt on the turntable is situated a streamlined elevation to minimize aerodynamic losses of the air at the intake part of said venturi duct.

7. The electrical energy generating device of claim 2 wherein on the intake windows on said skirt and the exit window of said cup are installed gates with means for opening and closing said windows.

\* \* \* \* \*